US007245166B2

United States Patent
Kurachi et al.

(10) Patent No.: US 7,245,166 B2
(45) Date of Patent: Jul. 17, 2007

(54) STARTER CIRCUIT

(75) Inventors: Kohei Kurachi, Nishio (JP); Hisashi Inaba, Kariya (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 61 days.

(21) Appl. No.: 11/332,177

(22) Filed: Jan. 17, 2006

(65) Prior Publication Data
US 2006/0170572 A1    Aug. 3, 2006

(30) Foreign Application Priority Data
Jan. 28, 2005    (JP) .............................. 2005-021341

(51) Int. Cl.
*H03K 3/02*    (2006.01)
(52) U.S. Cl. ..................................... 327/198; 327/142
(58) Field of Classification Search ..................... None
See application file for complete search history.

(56) References Cited

U.S. PATENT DOCUMENTS
6,205,192 B1 *    3/2001    Igura ......................... 375/354

FOREIGN PATENT DOCUMENTS
WO    WO 02/07302 A1    1/2002

* cited by examiner

*Primary Examiner*—Kenneth B. Wells
*Assistant Examiner*—An T. Luu
(74) *Attorney, Agent, or Firm*—Sughrue Mion, PLLC

(57) ABSTRACT

A starter circuit includes a start detection circuit for detecting a change of an input signal and outputting a start digital signal, a digital OR circuit for outputting a determination digital signal based on the start digital signal, a power supply circuit being activated based on the determination digital signal, and a digital control circuit being operated based on a power from the power supply circuit. The digital control circuit inputs a retention signal to the digital OR circuit for maintaining an operation of the power supply circuit and a reset signal to the start detection circuit for resetting the start detection circuit.

9 Claims, 2 Drawing Sheets

US 7,245,166 B2

STARTER CIRCUIT

CROSS REFERENCE TO RELATED APPLICATIONS

This application is based on and claims priority under 35 U.S.C. § 119 to Japanese Patent Application No. 2005-021341, filed on Jan. 28, 2005, the entire content of which is incorporated herein by reference.

FIELD OF THE INVENTION

This invention generally relates to a starter circuit. More particularly, the invention pertains to a structure of a starter circuit for an electronic circuit having a power supply circuit.

BACKGROUND

A known analog electronic circuit includes a power supply circuit for supplying power to each circuit. In order to activate the power supply circuit, a predetermined amount of electric charge is stored in a capacitor and then supplied as a starting current to the power supply circuit, which leads to an activation of each circuit. WO02/007302A1 discloses a technique for stably activating a piezoelectric oscillator by applying a predetermined level of voltage for promoting the start to a piezoelectric vibrator for the time required, by means of an instantaneous voltage supply means consisting of a capacitor and a transistor.

Recently, an electric circuit or a system that detects an approach or an existence of a human and then automatically starts operation has been developed. According to such the electric circuit or the system, a power supply other than a sensor circuit is turned to OFF position (i.e. in sleep mode) until the approach or the existence of the human is detected. That is, the power supply other than the sensor circuit is started when the approach or the existence of the human is detected so as to reduce as much standby power consumption as possible.

Precisely, for example, a system that has been increasingly used in a vehicle door or a front door of a house detects a change in capacitance in the vicinity of a door handle or a doorknob as soon as the approach of a user carrying a key with an ID code is detected, and then automatically unlocks the door. According to this system, which is called a smart entry system, a user carrying the key can unlock the door by approaching the door and touching the door handle or the doorknob by her/his hand as the change in capacitance is detected, The door in a locked state can be unlocked and opened by the user simply pulling the door handle or the doorknob accordingly.

Meanwhile, according to the aforementioned system, a circuit for determining whether the door should be unlocked or not performs a rather simple sequence such as detecting the change in capacitance in the vicinity of the door handle or the doorknob, and outputs a signal for unlocking the door. Therefore, a small digital circuit is frequently used for such the circuit. Further, such the circuit has been practically used in the smart entry system for a vehicle and thus the circuit needs to start as soon as the user carrying the ID key approaches to the door, detect the change in capacitance in the vicinity of the door handle, determine whether or not his/her hand touches the door handle, and then automatically unlocks the door. This function is necessary since at a time of the user carrying the ID key running to approach the door under a rainy weather and the like and operates the door handle, the smart entry system needs to function instantaneously so as to unlock the door.

Since the instantaneous voltage supply means disclosed in WO02/007302A1 uses a capacitor, the charging time is required for activation of the power supply circuit if the capacitor lacks the electric charge, and at the same time the power is consumed in the capacitor. As a result, the use of such the starter circuit in the smart entry system may cause increase of the starting time and the power consumption.

Thus, a need exists for a starter circuit that can be instantaneously started with reduced power consumption.

SUMMARY OF THE INVENTION

According to an aspect of the present invention, a starter circuit includes a start detection circuit for detecting a change of an input signal and outputting a start digital signal, a digital OR circuit for outputting a determination digital signal based on the start digital signal, a power supply circuit being activated based on the determination digital signal, and a digital control circuit being operated based on a power from the power supply circuit. The digital control circuit inputs a retention signal to the digital OR circuit for maintaining an operation of the power supply circuit and a reset signal to the start detection circuit for resetting the start detection circuit.

According to another aspect of the present invention, a starter circuit includes a start detection circuit for detecting a change in an input signal and outputting a start digital signal, a digital OR circuit for outputting a determination digital signal based on the start digital signal, a specific circuit power supply circuit being activated based on the determination digital signal, and a digital control circuit and an oscillator circuit being operated based on a power from the specific circuit power supply circuit. The oscillator circuit provides a clock signal to the digital control circuit, and the digital control circuit inputs a retention signal to the digital OR circuit for maintaining an operation of the specific circuit power supply circuit and a reset signal to the start detection circuit for resetting the start detection circuit.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
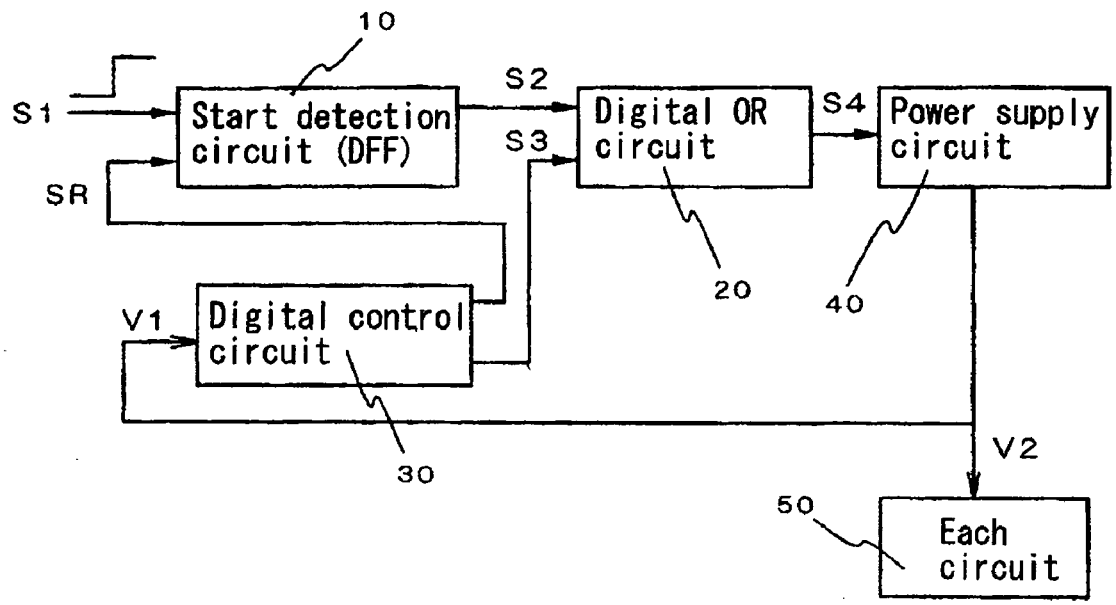
FIG. 1 is a block diagram of a starter circuit according to a first embodiment of the present invention.

A first embodiment of the present invention is explained with reference to FIG. 1. FIG. 1 is a block diagram of a high-speed starter circuit according to the present embodiment. A start detection circuit 10 is a delay flip flop circuit (DFF) for detecting a change of an input signal S1, i.e. precisely, a rising edge of an input signal S1 over a predetermined threshold value, so as to keep outputting a High level (i.e. H-level) signal. The H-level signal is input, as a start digital signal S2, to a digital OR circuit 20. The digital OR circuit 20 includes two input terminals and outputs a determination digital signal S4 based on each status of two input terminals. In cases where the H-level signal as the determination digital signal S4 is input to a power supply circuit 40, the power supply circuit 40 starts generating respective voltages V1 and V2 as an output power. 5V is specified for the voltage V1 as a power supply for a TTL signal, for example. The voltage V1 is input to a digital control circuit 30. The digital control circuit 30, which performs a predetermined sequence, is configured as a digital IC. When the voltage V1 is input to the digital control circuit 30, as an output of an internal sequence, the digital control circuit 30 keeps outputting the H-level signal as a retention signal S3 to the digital OR circuit 20 and also outputs 1 pulse signal as a reset signal SR to the start detection circuit 10. The voltage V2 is input to each circuit 50 so that each circuit 50 is activated, thereby causing an entire system (i.e. entire circuit) to start operation. In cases where the power supply circuit 40 supplies power to the entire starter circuit, the power supply circuit 40 can supply power so as to achieve a sleep mode in which the starter circuit operates with a lower power than that with which the starter circuit operates in a normal mode.

Next, an operation of the digital control circuit 30 is explained. The digital control circuit 30 is activated by the input of the voltage V1, and then keeps outputting the H-level signal as the retention signal S3 to the digital OR circuit 20. Thus, while the retention signal S3 is at the H-level, the determination digital signal S4 as an output of the digital OR circuit 20 remains at the H-level. Accordingly, the power supply circuit 40 keeps providing the power, thereby operating the entire system (i.e. entire circuit).

In addition, the digital control circuit 30 outputs the reset signal SR to the start detection circuit 10. This aims to externally reset the start detection circuit 10 since the start detection circuit 10 is not equipped with a self-reset function and thus keeps retaining the H-level after detecting increase of the voltage of the input signal S1. Accordingly, the start detection circuit 10 can be instantly ready for detection of a next input signal. Even if the start detection circuit 10 is once not able to detect rising of the input signal S1, the start detection circuit 10 can repeat detection a number of times. In cases where the start detection circuit 10 is reset, the digital signal S2 becomes LOW level (i.e. L-level). However, due to the aforementioned function of the retention signal S3, the determination digital signal S4 of the digital OR circuit 20 is at the H-level.

According to the aforementioned embodiment, once the digital control circuit 30 is started, the digital control circuit 30 brings the power supply circuit 40 to keep operation by means of the retention signal S3 (at the H-level) outputted by the digital control circuit 30 itself, and also brings the power supply of the entire circuit to be turned to OFF position (i.e. sleep mode with low power consumption) by means of the retention signal S3 at the L-level. Further, in a signal processing after the output by the start detection circuit 10, the circuits up to the digital control circuit 30 are activated through the digital processing. Thus, a time required for the start of the starter circuit is significantly reduced as compared to an analog starter circuit that uses a storage element such as a capacitor. Precisely, the starter circuit can start after approximately 10 msec from the reception of the input signal according to the present embodiment.

Figure 3:
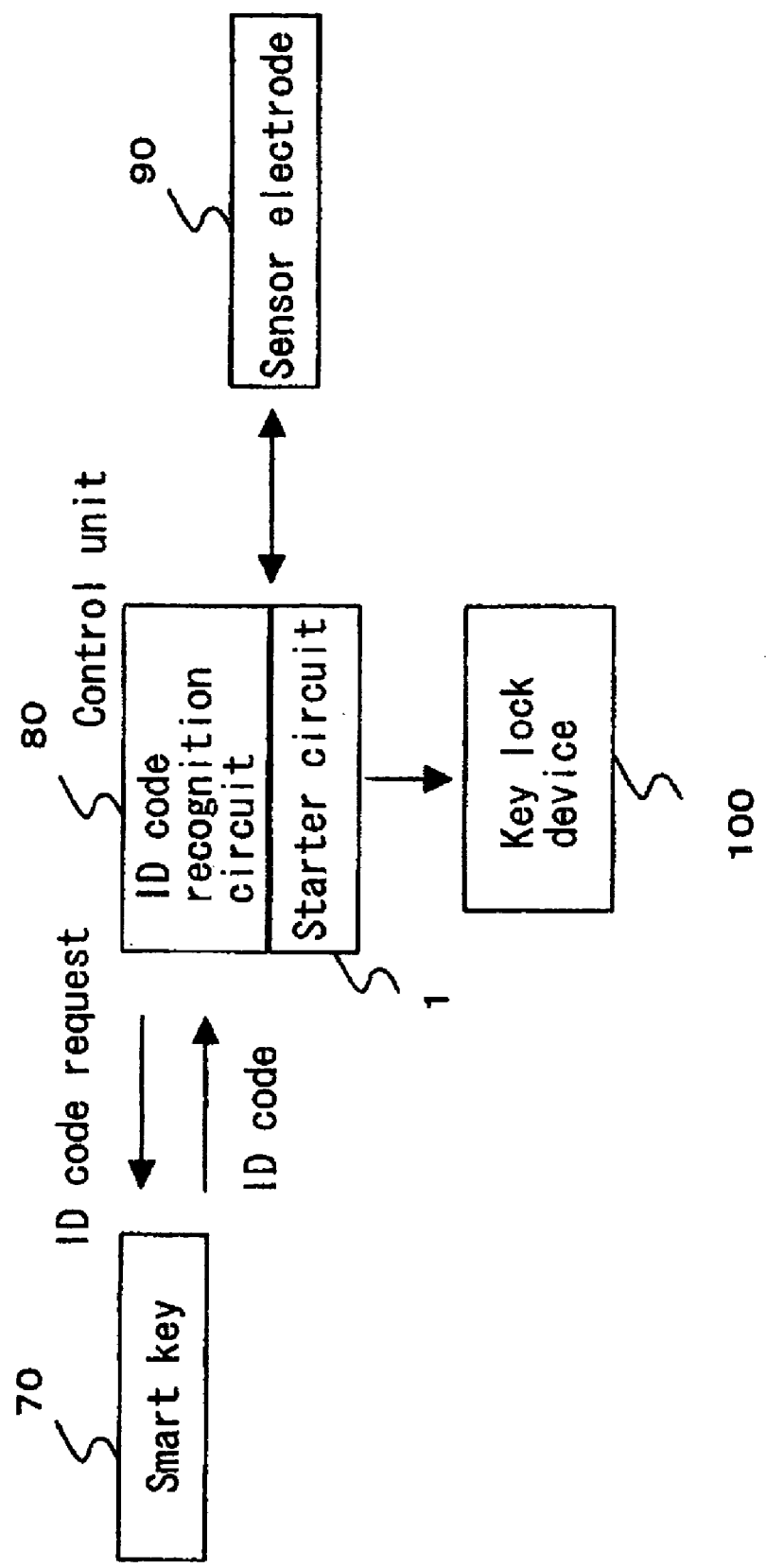
FIG. 3 is a block diagram of the starter circuit applied to a smart key system.

Next, a case in which the starter circuit 1 according to the present embodiment is used in a smart key system is explained with reference to a block diagram in FIG. 3. The smart key system installed in a vehicle includes an ID code recognition circuit 80 for emitting radio wave used for recognition of an ID code to an outside of the vehicle at a predetermined interval. Then, at a time of receiving the radio wave, a smart key 70 carried by a user returns an ID code through the radio wave to the vehicle. The ID code recognition circuit 80 in a control unit verifies the ID code and, if the verification is satisfied, outputs a signal in which a voltage is increased from a reference voltage. With this output signal, the digital control circuit 30 of the starter circuit 1 operates as in a manner shown above. Once the digital control circuit 30 is started, the digital control circuit 30 detects whether or not a hand of a user touches the door handle of the vehicle by means of a sensor electrode 90 shown as each circuit 50 in FIG. 1. Then, the digital control circuit 30 performs a sequence for detecting the change of capacitance in the vicinity of the door handle. When the digital control circuit 30 detects that the hand of the user touches the door handle by means of the sensor electrode 90, the control unit outputs a signal to a key lock device 100 of the vehicle so as to unlock the door. Accordingly, the user with the ID code can unlock and open the door by approaching the vehicle and pulling the door handle, without performing a practical operation for unlocking the door.

Figure 2:
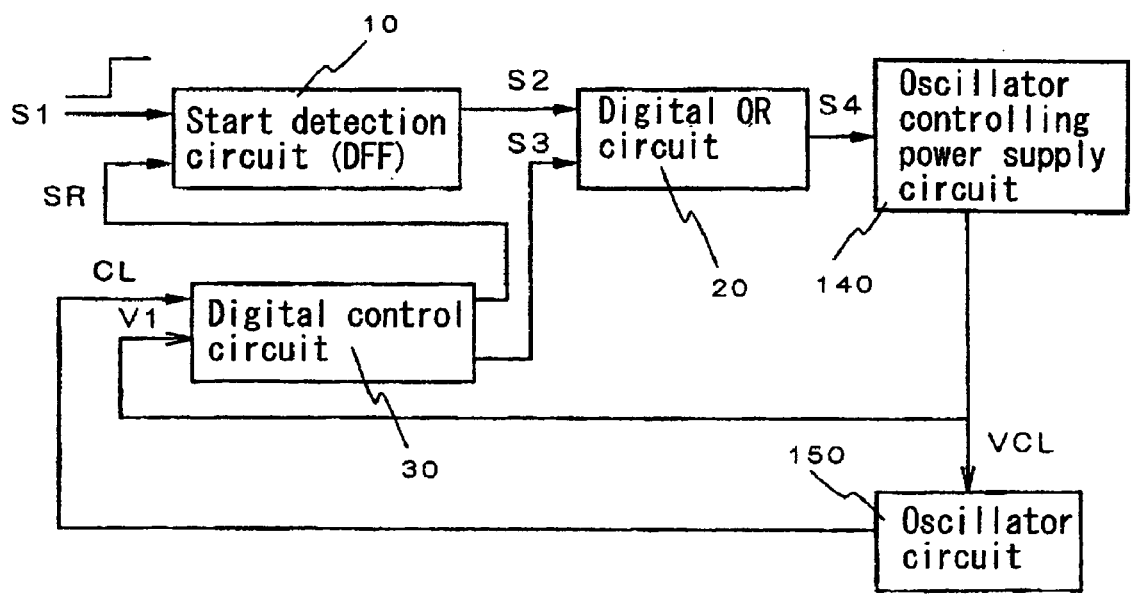
FIG. 2 is a block diagram of the starter circuit according to a second embodiment of the present invention.

A second embodiment of the present invention is explained with reference to FIG. 2.

According to the second embodiment, an oscillator controlling power supply circuit 140 serving as a specific circuit power supply circuit is used instead of the power supply circuit 40. In addition, a voltage VCL of the oscillator controlling power supply circuit 140 is provided to an oscillator circuit 150. Further, a clock signal CL generated by the oscillator circuit 150 is provided to the digital control circuit 30. The rest structure of the second embodiment is same as that of the first embodiment and thus the explanation thereof is omitted. The oscillator controlling power supply circuit 140 receives the determination digital signal S4 at the H-level and then starts providing the voltage VCL to the oscillator circuit 150. Upon reception of the voltage VCL, the oscillator circuit 150 generates the clock signal CL, which is then provided to the digital control circuit 30. The digital control circuit 30 is able to perform a clock operation with the clock signal CL According to this structure, the instantaneous clock operation of the digital control circuit 30 is possible and thus stable performance can be achieved.

Further, with the oscillator circuit 150 provided as the power supply circuit, a specific circuit can be instantaneously activated and also the power supply can be instantaneously turned off (i.e. in sleep mode). A part of circuits in the entire system can be started or brought in the sleep mode at high-speed accordingly.

According to the aforementioned embodiments, the smart key system of the vehicle is explained as an example. However, the starter circuit is applicable to a mobile terminal of a mobile phone operated by a battery, for which the high-speed starting and the sleep mode of a predetermined circuit can be achieved, thereby reducing the power consumption.

Further, according to the aforementioned embodiments, a time required for starting the entire circuit is remarkably reduced. In addition, since a capacitor is not used for starting the power supply circuit, a power consumption can be reduced. Further, even if the start detection circuit 10 is not equipped with a self-reset function, the start detection circuit 10 can be surely reset by means of the reset signal SR from the digital control circuit 30. Thus, the start detection circuit 10 can be ready for starting the detection of the next input signal. Since the digital control circuit 30 is able to output the retention signal S3 for maintaining the power supply circuit 40 to operate, the power of the power supply circuit 40 can be surely turned to ON position by the stop of outputting the retention signal SR from the digital control circuit 30.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A starter circuit comprising:
a start detection circuit for detecting a change of an input signal and outputting a start digital signal;
a digital OR circuit for outputting a determination digital signal based on the start digital signal;
a power supply circuit being activated based on the determination digital signal; and
a digital control circuit being operated based on a power from the power supply circuit;
wherein the digital control circuit inputs a retention signal to the digital OR circuit for maintaining an operation of the power supply circuit and a reset signal to the start detection circuit for resetting the start detection circuit.

2. A starter circuit according to claim 1, wherein the start detection circuit is a delay flip flop circuit.

3. A starter circuit comprising:
a start detection circuit for detecting a change in an input signal and outputting a start digital signal;
a digital OR circuit for outputting a determination digital signal based on the start digital signal;
a specific circuit power supply circuit being activated based on the determination digital signal; and
a digital control circuit being operated based on a power from the specific circuit power supply circuit; and
an oscillator circuit being operated based on a power from the specific circuit power supply circuit; wherein the oscillator circuit provides a clock signal to the digital control circuit, and the digital control circuit inputs a retention signal to the digital OR circuit for maintaining an operation of the specific circuit power supply circuit and a reset signal to the start detection circuit for resetting the start detection circuit.

4. A starter circuit according to claim 3, wherein the start detection circuit is a delay flip flop circuit.

5. A starter circuit according to claim 1, wherein once the digital control circuit is activated, the digital control circuit brings the power supply circuit to operate by means of the retention signal in a first state outputted by the digital control circuit, and brings the power supply circuit to stop by means of the retention signal in a second state.

6. A starter circuit according to claim 1, wherein once the digital control circuit is activated, the digital control circuit brings the power supply circuit to operate by means of the retention signal in a first state outputted by the digital control circuit, and brings the power supply circuit in a sleep state with low power consumption by means of the retention signal in a second state.

7. A starter circuit according to claim 3, wherein the specific circuit power supply circuit starts providing a power to the oscillator circuit based on the determination digital signal.

8. A starter circuit according to claim 3, wherein the oscillator circuit connected to the specific circuit power supply circuit generates the clock signal to be provided to the digital control circuit based on a power from the specific circuit power supply circuit.

9. A starter circuit according to claim 3, wherein the digital control circuit performs a clock operation by means of the clock signal.

* * * * *